(12) United States Patent
Soon-Shiong

(10) Patent No.: US 12,506,804 B2
(45) Date of Patent: *Dec. 23, 2025

(54) DISTRIBUTED STORAGE SYSTEMS AND METHODS

(71) Applicant: Patrick Soon-Shiong, Los Angeles, CA (US)

(72) Inventor: Patrick Soon-Shiong, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,591

(22) Filed: Feb. 8, 2024

(65) Prior Publication Data

US 2024/0187481 A1 Jun. 6, 2024

Related U.S. Application Data

(63) Continuation of application No. 18/142,925, filed on May 3, 2023, now Pat. No. 11,930,077, which is a
(Continued)

(51) Int. Cl.
*G06F 15/16* (2006.01)
*G06F 16/957* (2019.01)
(Continued)

(52) U.S. Cl.
CPC ...... *H04L 67/1097* (2013.01); *G06F 16/9574* (2019.01); *H04L 41/28* (2013.01);
(Continued)

(58) Field of Classification Search
CPC ..... H04L 67/1097; H04L 67/01; H04L 67/52; H04L 67/5681; H04L 67/568;
(Continued)

(56) References Cited

U.S. PATENT DOCUMENTS 6,021,327 A 2/2000 Nguyen et al.
7,068,189 B2 6/2006 Brescia
(Continued)

FOREIGN PATENT DOCUMENTS

EP 1248188 A1 10/2002
JP 11-065434 A 3/1999
(Continued)

OTHER PUBLICATIONS

Samsung's Guide to DLNA, Samsung Electronics America, Nov. 26, 2008, V1.3, 10 pages.
(Continued)

*Primary Examiner* — Normin Abedin
(74) *Attorney, Agent, or Firm* — MASCHOFF BRENNAN; Andrew A. Noble

(57) ABSTRACT

The inventive subject matter provides apparatus, systems, and methods of pre-loading (or caching) activatable content to several mobile devices for future use by at least one of the mobile devices. The mobile devices are communicatively coupled with each other to form a distribute storage network. The pre-loaded content can be used by applications executed in any one of the mobile devices within the network. A content server is configured to transmit portions of the content to the mobile devices upon detection that a subset of conditions within the multi-conditional content activation criteria has been satisfied. The content server is configured to transmit the entire content when all conditions within the multi-conditional content activation criteria has been satisfied. The content server then activates the content when a content activation event is detected.

22 Claims, 5 Drawing Sheets

Related U.S. Application Data continuation of application No. 16/941,466, filed on Jul. 28, 2020, now Pat. No. 11,677,823, which is a continuation of application No. 16/174,003, filed on Oct. 29, 2018, now Pat. No. 10,819,790, which is a continuation of application No. 15/425,933, filed on Feb. 6, 2017, now Pat. No. 10,778,766, which is a continuation of application No. 15/295,959, filed on Oct. 17, 2016, now Pat. No. 10,158,713, which is a continuation of application No. 14/048,394, filed on Oct. 8, 2013, now Pat. No. 9,509,803.

(60) Provisional application No. 61/710,998, filed on Oct. 8, 2012.

(51) Int. Cl.
| | |
|---|---|
| *H04L 41/28* | (2022.01) |
| *H04L 67/1074* | (2022.01) |
| *H04L 67/1097* | (2022.01) |
| *H04L 67/52* | (2022.01) |
| *H04L 67/568* | (2022.01) |
| *H04L 67/5681* | (2022.01) |
| *H04W 4/18* | (2009.01) |
| *H04W 4/50* | (2018.01) |
| *H04L 67/12* | (2022.01) |
| *H04W 4/021* | (2018.01) |
| *H04W 84/12* | (2009.01) |

(52) U.S. Cl.
CPC .......... *H04L 67/1074* (2013.01); *H04L 67/52* (2022.05); *H04L 67/568* (2022.05); *H04L 67/5681* (2022.05); *H04W 4/18* (2013.01); *H04W 4/50* (2018.02); *H04L 67/12* (2013.01); *H04L 2209/603* (2013.01); *H04W 4/021* (2013.01); *H04W 84/12* (2013.01)

(58) Field of Classification Search
CPC ..... H04L 41/28; H04L 67/1074; H04L 67/12; H04L 2209/603; H04W 4/50; H04W 4/18; H04W 4/021; H04W 84/12; G06F 16/9574
See application file for complete search history.

(56) References Cited

U.S. PATENT DOCUMENTS

| | | |
|---|---|---|
| 7,111,044 B2 | 9/2006 | Lee |
| 7,430,633 B2 | 9/2008 | Church et al. |
| 7,607,582 B2 | 10/2009 | Vallabh et al. |
| 7,743,213 B2 | 6/2010 | Hong |
| 8,041,643 B2 | 10/2011 | Mukerji et al. |
| 8,176,176 B1 | 5/2012 | Chan |
| 8,265,862 B1 | 9/2012 | Zilka |
| 8,271,889 B1 | 9/2012 | Beckert et al. |
| 8,413,198 B2 | 4/2013 | Connor et al. |
| 8,447,834 B1 | 5/2013 | Koya et al. |
| 8,516,114 B2 | 8/2013 | Banavar et al. |
| 8,576,744 B2 | 11/2013 | Kovvali et al. |
| 8,583,551 B2 | 11/2013 | Littrell et al. |
| 8,626,138 B2 | 1/2014 | Dahod et al. |
| 8,627,451 B2 | 1/2014 | Walsh et al. |
| 8,631,505 B1 | 1/2014 | Coronel et al. |
| 8,667,542 B1 | 3/2014 | Bertz et al. |
| 8,788,849 B2 | 7/2014 | Hahn et al. |
| 8,819,445 B2 | 8/2014 | Schrecker |
| 8,832,029 B2 | 9/2014 | Bezbaruah et al. |
| 8,909,810 B2 | 12/2014 | Caine et al. |
| 8,935,366 B2 | 1/2015 | Mehr et al. |
| 8,996,489 B2 | 3/2015 | Leblanc et al. |
| 9,071,603 B1 | 6/2015 | Frederick et al. |
| 9,400,875 B1* | 7/2016 | Barraclough ........... H04L 67/63 |
| 9,495,760 B2 | 11/2016 | Swaminathan et al. |
| 9,509,803 B2 | 11/2016 | Soon-Shiong |
| 9,518,833 B2 | 12/2016 | Fink |
| 9,531,522 B2 | 12/2016 | El Gamal et al. |
| 9,606,993 B2 | 3/2017 | Kaila et al. |
| 9,639,825 B1 | 5/2017 | Roth et al. |
| 9,781,540 B2 | 10/2017 | Jagannathan et al. |
| 9,883,360 B1 | 1/2018 | Haney |
| 10,158,713 B2 | 12/2018 | Soon-Shiong |
| 10,778,766 B2 | 9/2020 | Soon-Shiong |
| 10,819,790 B2 | 10/2020 | Soon-Shiong |
| 11,677,823 B2 | 6/2023 | Soon-Shiong |
| 11,930,077 B2 | 3/2024 | Soon-Shiong |
| 2002/0026482 A1 | 2/2002 | Morishige et al. |
| 2003/0014497 A1 | 1/2003 | Pathak et al. |
| 2004/0046655 A1 | 3/2004 | Benes et al. |
| 2004/0133847 A1 | 7/2004 | Iino et al. |
| 2005/0026117 A1 | 2/2005 | Judson et al. |
| 2005/0055578 A1 | 3/2005 | Wright et al. |
| 2006/0020622 A1 | 1/2006 | Shelton |
| 2006/0116908 A1 | 6/2006 | Dew et al. |
| 2006/0159456 A1 | 7/2006 | Gumaste et al. |
| 2007/0067309 A1 | 3/2007 | Klein et al. |
| 2007/0130023 A1* | 6/2007 | Wolinsky ........... G06Q 30/0277 |
| | | 705/27.1 |
| 2008/0120242 A1 | 5/2008 | Krig et al. |
| 2008/0160956 A1 | 7/2008 | Jackson et al. |
| 2008/0215418 A1 | 9/2008 | Kolve et al. |
| 2008/0224586 A1 | 9/2008 | Yamada |
| 2008/0248779 A1* | 10/2008 | Tsui ..................... H02J 50/001 |
| | | 455/414.2 |
| 2009/0143056 A1 | 6/2009 | Tang et al. |
| 2009/0171166 A1 | 7/2009 | Amundson et al. |
| 2009/0217352 A1 | 8/2009 | Shen et al. |
| 2009/0271221 A1 | 10/2009 | Aridi et al. |
| 2009/0276474 A1 | 11/2009 | Sela et al. |
| 2010/0010424 A1 | 1/2010 | Yu et al. |
| 2010/0069058 A1 | 3/2010 | Rothschild |
| 2010/0082369 A1 | 4/2010 | Prenelus et al. |
| 2010/0250704 A1 | 9/2010 | Kittel |
| 2010/0267403 A1 | 10/2010 | Lungaro et al. |
| 2010/0287011 A1 | 11/2010 | Muchkaev |
| 2010/0293598 A1 | 11/2010 | Collart et al. |
| 2010/0321465 A1 | 12/2010 | Behrens |
| 2010/0332586 A1 | 12/2010 | Jogand-Coulomb et al. |
| 2011/0029670 A1 | 2/2011 | Klein et al. |
| 2011/0072264 A1 | 3/2011 | McNulty |
| 2011/0161130 A1 | 6/2011 | Whalin et al. |
| 2011/0231767 A1 | 9/2011 | Russell et al. |
| 2011/0235592 A1 | 9/2011 | Hoefel et al. |
| 2011/0289433 A1 | 11/2011 | Whalin et al. |
| 2011/0306304 A1 | 12/2011 | Forutanpour et al. |
| 2011/0307319 A1 | 12/2011 | Balestrieri et al. |
| 2012/0066337 A1 | 3/2012 | Wu et al. |
| 2012/0110044 A1 | 5/2012 | Nagpal et al. |
| 2012/0131125 A1 | 5/2012 | Seidel et al. |
| 2012/0144448 A1 | 6/2012 | Gunawardena et al. |
| 2012/0163290 A1 | 6/2012 | Krafft et al. |
| 2012/0179980 A1 | 7/2012 | Whalin et al. |
| 2012/0179981 A1 | 7/2012 | Whalin et al. |
| 2012/0185951 A1 | 7/2012 | Bauman et al. |
| 2012/0190386 A1 | 7/2012 | Anderson |
| 2012/0209812 A1 | 8/2012 | Bezbaruah et al. |
| 2012/0254328 A1 | 10/2012 | Lee |
| 2012/0270576 A1 | 10/2012 | Herrington et al. |
| 2012/0297466 A1 | 11/2012 | Li |
| 2013/0035163 A1 | 2/2013 | Lee et al. |
| 2013/0144968 A1 | 6/2013 | Berger |
| 2013/0226992 A1 | 8/2013 | Bapst et al. |
| 2013/0227052 A1 | 8/2013 | Wenzel et al. |
| 2013/0296048 A1* | 11/2013 | Jeffery .................. A63F 13/92 |
| | | 463/31 |
| 2014/0046690 A1 | 2/2014 | Gunderson et al. |
| 2014/0289515 A1 | 9/2014 | Sorotokin et al. |

FOREIGN PATENT DOCUMENTS

| | | |
|---|---|---|
| JP | 2002-259626 A | 9/2002 |
| JP | 2003223355 A | 8/2003 |

(56) References Cited

FOREIGN PATENT DOCUMENTS

| JP | 2003-296226 | A | 10/2003 |
|---|---|---|---|
| JP | 2003319913 | A | 11/2003 |
| JP | 2004133502 | A | 4/2004 |
| JP | 2005064560 | A | 3/2005 |
| JP | 2006048575 | A | 2/2006 |
| JP | 2008-003921 | A | 1/2008 |
| JP | 2010205185 | A | 9/2010 |
| JP | 2011165219 | A | 8/2011 |
| KR | 20060052503 | A | 5/2006 |
| KR | 10-2009-0001421 | | 1/2009 |
| WO | 2012177194 | A1 | 12/2012 |

OTHER PUBLICATIONS

Anthony, Sebastian, How Big Is the Cloud?, ExtremeTech, May 23, 2012, <http://www.extremetech.com/computing/129183-how-big-is-the-cloud>, 7 pages.

Extended European Search Report issued in European Patent Application No. 13845602.5 dated Jun. 17, 2016, 4 pages.

Kirchner, Holger, et al. A Location-aware Prefetching Mechanism, http://citeseerx.ist.psu.edu/viewdoc/download?doi=10.1.1.119.3896&rep=rep1&type=pdf, Jan. 1, 2004, 8 pages.

McCluer, Stephen, et al., Comparing Data Center Batteries, Flywheels, and Ultracapacitors, 2008, pp. 1-16, Schneider Electric—Data Center Science Center, White Paper 65, Rev 2.

International Search Report and the Written Opinion of the International Searching Authority, or the Declaration, PCT Application No. PCT/US13/63820, dated Jan. 29, 2014, 9 pages.

Pham, Minh-Tri, et al., Detection Caching for Faster Object Detection, 2005, pp. 1-8, Proceedings of IEEE International Workshop on Modeling People and Human Interaction (PHI), Beijing, China.

Office Action issued in Chinese Patent Application No. 2013800524778 dated Aug. 3, 2016, 12 pages.

Office Action issued in Japanese Patent Application No. 2015-535887 dated Sep. 13, 2016, 5 pages.

Second Office Action issued Apr. 12, 2017, by the State Intellectual Property Office of PRC for Chinese Patent Application No. 2013800524778, 16 pages.

Decision for Grant of Patent issued in Korean Patent Application No. 10-2015-7011958 dated Apr. 19, 2018, 3 pages.

Office Action issued in Japanese Patent Application No. 2017-080174 dated Apr. 24, 2018, 9 pages.

Extended European Search Report issued in European Patent Application No. 18159529.9 dated Mar. 28, 2018, 5 pages.

Mundhra, Ashish, "How to Set Up a PIN to Secure App Purchases on Play Store," Jul. 5, 2017, https://www.guidingtech.com/12267/set-up-pin-secure-app-purchases-android/, 11 pages.

Rouse, Margaret, "Biometric Payment," Aug. 2006, http://searchsecurity.techtarget.com/definition/biometric-payment, 5 pages.

Wikipedia, "Skylanders", Oct. 13, 2011, https://en.wikipedia.org/wiki/Skylanders, 13 pages.

Iwata, Tetsuya, et al. "A DRM system suitable for P2P content delivery and the study on its implementation." Communications, 2003. APCC 2003. The 9th Asia-Pacific Conference on. vol. 2. IEEE, 2003, 6 pages.

Chu, C. C., et al. "Mobile DRM for multimedia content commerce in P2P networks." IEEE consumer communications and networking conference, Jan. 8-10, 2006, 5 pages.

Sung, Jae-Youn, et al. "DRM enabled P2P architecture." 2006 8th International Conference Advanced Communication Technology. vol. 1. IEEE, Feb. 20-22, 2006, 4 pages.

Office Action issued in Korean Patent Application No. 10-2018-7017749 dated Apr. 30, 2019, 6 pages.

European Search Report issued in European Patent Application No. 19161969.1 dated Apr. 12, 2019, 7 pages.

Office Action issued in Japanese Patent Application No. 2018-205044 dated Jan. 14, 2020.

European Search Report and Search Opinion received for European Application No. 18159529.9, mailed on Mar. 28, 2018, 4 pages.

International Preliminary Report on Patentability received for PCT Patent Application No. PCT/US2013/063820, mailed on Apr. 16, 2015, 6 pages.

\* cited by examiner

DISTRIBUTED STORAGE SYSTEMS AND METHODS

CROSS REFERENCE TO RELATED APPLICATIONS

This application is a continuation of U.S. application Ser. No. 18/142,925, filed May 3, 2023, which is a continuation of U.S. application Ser. No. 16/941,466, filed Jul. 28, 2020, which is a continuation of U.S. application Ser. No. 16/174,003, filed Oct. 29, 2018, which is a continuation of U.S. application Ser. No. 15/425,933, filed Feb. 6, 2017, which is a continuation of U.S. application Ser. No. 15/295,959, filed Oct. 17, 2016, which is a continuation of U.S. application Ser. No. 14/048,394, filed Oct. 8, 2013, which claims the benefit of priority to U.S. provisional Application No. 61/710,998, filed on Oct. 8, 2012. This and all other referenced extrinsic materials are incorporated herein by reference in their entirety.

FIELD OF THE INVENTION

The field of the invention is distributed storage systems and methods.

BACKGROUND

The following description includes information that may be useful in understanding the present invention. It is not an admission that any of the information provided herein is prior art or relevant to the presently claimed invention, or that any publication specifically or implicitly referenced is prior art.

Mobile devices provide many conveniences to people nowadays due to their portability. As these mobile devices are getting more powerful, more features and functionalities from these devices are demanded. Often times, large data sets are needed to support some of these features and functionalities (e.g., object-recognition data set, digital media such as videos, audios, documents, augmented reality content, etc.). It is not realistic or optimal to permanently store the entire data sets for all of the features and functionalities that might be activated from time to time, especially when the storage space in these mobile devices are comparatively small. It has been contemplated by others to have these large data sets be stored remotely (e.g., in the cloud), and have the mobile devices retrieve these data sets on demand. Thus, the data sets reside remotely, and only when certain related functionalities are activated the data sets are retrieved by the mobile devices. One disadvantage of this solution is the latency to gain access to the functionalities created by retrieving these datasets. Due to the size of these datasets and the limited bandwidth of these mobile devices, it may take minutes or hours to download the entire datasets required by certain functionalities.

Effort has been made in developing systems and methods of managing the access of data content among portable storage devices on a network. For example, U.S. Pat. No. 7,743,213 to Hong, entitled "Portable Storage Device with Network Function," issued Jun. 22, 2010, discusses an electronic apparatus coupled to a plurality of portable storage devices and managing the access of content between the memory unit of each portable storage device and a remote network host. Hong, however, does not teach managing the activation or deactivation of the content distributed among the portable storage devices. U.S. patent application 2010/0205148 to Leblanc et al. entitled "Method and System for Pushing Content to Mobile Devices," published Aug. 12, 2010, discusses the pushing of content to a plurality of mobile devices such that the content is stored locally on the device and available for offline viewing. Unfortunately, Leblanc also fails to provide insight into methods of activating or deactivating the stored content online or offline, locally or otherwise.

U.S. Patent Publication 2013/0227052 entitled "Image Content Based Prediction and Image Cache Controller" to Wenzel et al., filed Oct. 27, 2011, discloses a caching controller that predicts multiple views of images that a user would view in the near future based on the current view of images, and pre-loading those multiple view of images on the device. A non-patent literature document entitled "Detection Caching for Faster Object Detection" by Pham et al., published in 2005, discloses a method of pre-loading certain face detection parameters that were previously computed based on similarity between the current image and a previous image.

Other efforts made in the area of improving the speed of application based on caching include U.S. Patent Publication 2012/0099533 entitled "Content Caching in the Radio Access Network (RAN)" to Kovvali et al., filed Dec. 29, 2011, U.S. Patent Publication 2012/0243732 entitled "Adaptable Framework for Cloud Assisted Augmented Reality" to Swaminathan et al., filed Sep. 19, 2011, and International Application WO 2012/177194 entitled "Caching Support for Visual Search and Augmented Reality in Mobile Networks" to Damola, filed Jun. 21, 2011.

Even though the above references are useful when data for only one specific purpose application is being dealt with, they do not address circumstances that are unique to mobile devices, which is when many different applications can be activated in different situations. Thus, there is still a need for a distributed storage system in which data content and associated activation criteria are disseminated across the readable memory of a plurality of mobile devices via a mobile device interface.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element being essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The inventive subject matter provides apparatus, systems and methods in which one can distribute and store a set of data content across one or more mobile devices.

The inventive subject matter provides apparatus, systems, and methods of pre-loading (or caching) content to several mobile devices for future use by at least one of the mobile devices. In some embodiments, the mobile devices are communicatively coupled with each other to form a network (e.g., a personal network, a peer-to-peer network, etc.). Thus, the pre-loaded content can be used by applications executed in any one of the mobile devices within the network.

In some embodiments, a storage system that performs such content pre-loading operations includes a mobile device interface configured to couple with a plurality of mobile devices and a content server coupled with the mobile device interface. Each mobile device includes a computer readable memory having a storage area. The content server is configured to obtain multi-conditional content activation criteria related to activatable content. In some embodiments, the multi-conditional content activation criteria operate as a function of mobile device attributes. The content server is also configured to cause a first mobile device from the plurality of mobile devices to store a portion of the activatable content as inactive content in its storage area according to satisfaction of a proper subset of the multi-conditional content activation criteria.

The content server is also configured to enable a second mobile device from the plurality of mobile devices to activate the activatable content upon satisfaction of the multi-conditional content activation criteria and availability of the activatable content. In some embodiments, the first and second mobile devices are identical.

In some embodiments, the mobile devices communicate with each other over a wired interface, such as an Ethernet interface, an optic fiber interface, an asynchronous transfer mode interface, or a public switched telephone network. In other embodiments, the mobile devices communicate with each other over a wireless interface such as an Wi-Fi interface, WiGIG interface, a celluar interface, a mesh network interface, a WiMAX interface, a microwave interface, an Ultra-wideband interface, a wireless HD interface, a wireless personal area network, a wireless home digital interface, wireless USB, and ZigBee.

Examples of the mobile devices within the storage system includes a computing device, such as a tablet, a computer, a set top box, a smart phone, an e-book reader, a game console, and an electronic pen. Some of the mobile devices can be a vehicle, such as an automobile, an aircraft, a spacecraft, a boat, a ship, a submersible, a bus, a train, and a truck.

In some embodiments, the storage area on each mobile device is at least partially under control of the content server. For example, the content server can restrict access to the content in the storage area. The storage area of some embodiments also comprises a secured portion that is secured under command of the content server. The storage area can also compose a virtual machine that is at least partially under control of the content server. In these embodiments, the interaction between the mobile device and the content server occurs within the virtual machine under command of the content server.

The content that is obtained by the mobile devices can be at least one of the following: text data, image data, video data, kinesthetic data, audio data, application data, telematics data, and functionality data.

The content server can cause the content to be activated upon detecting a content activation event. In some embodiments, the content server can activate the activatable content by presenting the activatable content, executing of the activatable content, transmitting of the activatable content, deleting of the activatable content, managing the activatable content, indexing the activatable content, configuring the content server and/or the mobile device based on the activatable content, transacting using the activatable content, and modifying the activatable content.

The multi-conditional content activation criteria can depend on many different factors, such as on a payment, on recognition of a digital representation of an object as a target object, on a user interaction with at least one of the mobile devices, or on a context of at least one of the mobile devices. The context is based on sensor data obtained from the at least one of the mobile devices The digital representation of the object represents at least one of the following: a sound, a symbol, a two dimensional object, a three dimensional object, a movement, an image, a magazine, a newspaper, a display screen, a toy, and a vehicle.

In some embodiments, the content server is configured to exchange content information related to the activatable content with the first mobile device via a content exchange protocol. The content exchange protocol includes at least one of the following: a universal plug-n-play protocol, a Digital Living Network Alliance (DLNA) framework, a media transport protocol, and a high definition multi-media interface protocol.

The content server is further configured to enable the second mobile device to activate the activatable content by at least one of the following: unlocking the content, revealing the content, authorizing access, authenticating a user, and moving the content to a non-content server controlled memory.

The content server is further configured to identify an activation event upon satisfaction of the multi-conditional content activation criteria. The activation event can be at least one of the following: a point-of-use, a payment, a rating, a vote, and a context.

The content server is further configured to provide the content to the first mobile device over a network. In some embodiments, the content is provided over the network during off-peak hours. In other embodiments, the content is provided over the network according to a fee-schedule. The content is pre-cached in the storage area of the first mobile device.

In some embodiments, the storage areas of at least some of the mobile devices compose a distributed storage area network. The content server is then configured to manage the distribute storage area network and/or manage the content within the distribute storage area network. In some embodiments, the distributed storage area network comprises a cellular backbone, an optic fiber backbone, or a mesh backbone.

In some embodiments, the distributed storage area network is independently-powered at least in part by gasoline. The distributed storage area network comprises a data density of at least one Terabyte per 100 m$^2$. In some embodiments, at least some of the storage areas within the distributed storage area network move relative to each other.

In some embodiments, the storage area of the at least one of the mobile devices comprises at least one Gigabyte. Preferably, the storage area of the at least one of the mobile devices comprises at least one Terabyte.

In addition, the content server is further configured to cause the first mobile device to store a second additional portion of the activatable content as inactive content in its storage area according to satisfaction of a second larger proper subset of the multi-conditional content. The content server is also configured to cause the first mobile device to remove the portion of the activatable content from its storage area when the proper subset of the multi-conditional content is satisfied.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
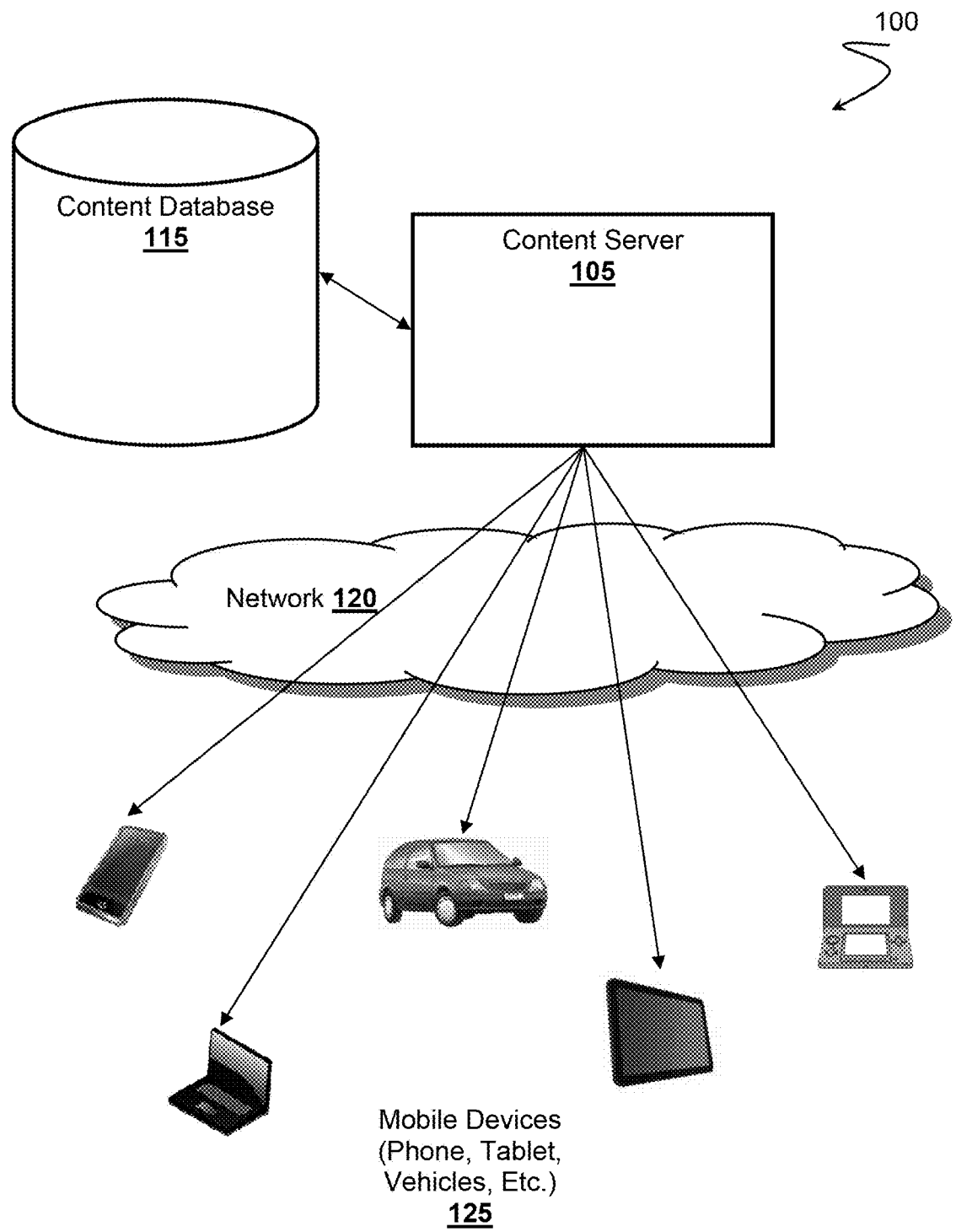
FIG. 1 illustrates a general schematic of a data storage system.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The inventive subject matter provides apparatus, systems, and methods of pre-loading (or caching) content to several mobile devices for future use by at least one of the mobile devices. In some embodiments, the mobile devices are communicatively coupled with each other to form a network, such as a personal network, or a peer-to-peer network. Thus, the pre-loaded content can be used by applications executed in any one of the mobile devices within the network.

A personal area network can include portable disparate devices that a user would carry and use, the devices can include smart phones, smart watches, smart glasses, music players, portable game consoles, etc. These devices often can use short-range wired or wireless communication interface to communicate with each other (e.g., Bluetooth®, wifi, etc.).

FIG. 1 illustrates an example content storage system 100 of some embodiments. The storage system 100 includes a content server 105, a content database 115, and several mobile devices 125 that are coupled with each other over a network 120 via a mobile device interface. As shown, the mobile devices that are connected with each other in the storage system 100 can include different types of mobile devices. Examples of mobile devices include a mobile phone, a laptop, a tablet, a portable game console, an e-book reader, an electronic pen, a set top box, medical device, or any other portable computing devices. In addition, the mobile devices can also include a vehicle such as an automobile, an aircraft, a spacecraft, a boat, a ship, a submersible, a bus, a train, or a truck. Each mobile device comprises a processor for executing a set of instructions and a storage area for storing content that will be used by software applications executed in the mobile device.

The mobile devices can be coupled with each other in many ways. In some embodiments, the mobile devices can be coupled with each other via a wired interface, such as an Ethernet interface, an optic fiber interface, an asynchronous transfer mode interface, or even a public switched telephone network. In other embodiments, the mobile devices can be coupled with each other via a wireless interface, such as an Wi-Fi interface, WiGIG interface, a cellular interface, a mesh network interface, a WiMAX interface, WiGIG, a microwave interface, an Ultra-wideband interface, a wireless HD interface, a wireless personal area network, a wireless home digital interface, a wireless USB interface, or ZigBee interface.

In some embodiments, the content server 105 can be implemented in one of the mobile devices or distributed across more than one mobile device. In other embodiments, the content server 105 can be implemented at a device physically separated from the mobile devices, and communicatively coupled with the mobile devices through a network (e.g., the Internet, a peer-to-peer network, a local area network, etc.).

As shown in FIG. 1, the content server 105 is communicatively coupled with the content database 115. In some embodiments, the content database is configured to store content for software applications that can be executed by at least one of the mobile devices. Preferably, the content that is stored in the content database is sufficiently large such that it is impossible or impractical to store the content locally at the mobile devices. In some embodiments, the content that is being stored in the content database is activatable, meaning that the each portion of the content can be activated to be used by a software application. Examples of activatable content that is stored in the content database 115 include object recognition data for an object recognition application, audio data for an audio player, video data for a video player, image data for an image viewing application, text data for a text reading application, map and traffic data for a navigation application, kinesthetic data, application data, telematics data, functionality data, medical data, patient data, or business data for a business recommendation engine.

The content server 105 of some embodiments is configured to cause at least one of the mobile devices to retrieve (e.g., download) content associated with a software application and store the content locally in the storage area of the at least one mobile device before instructions for activating the content are received.

Figure 2:
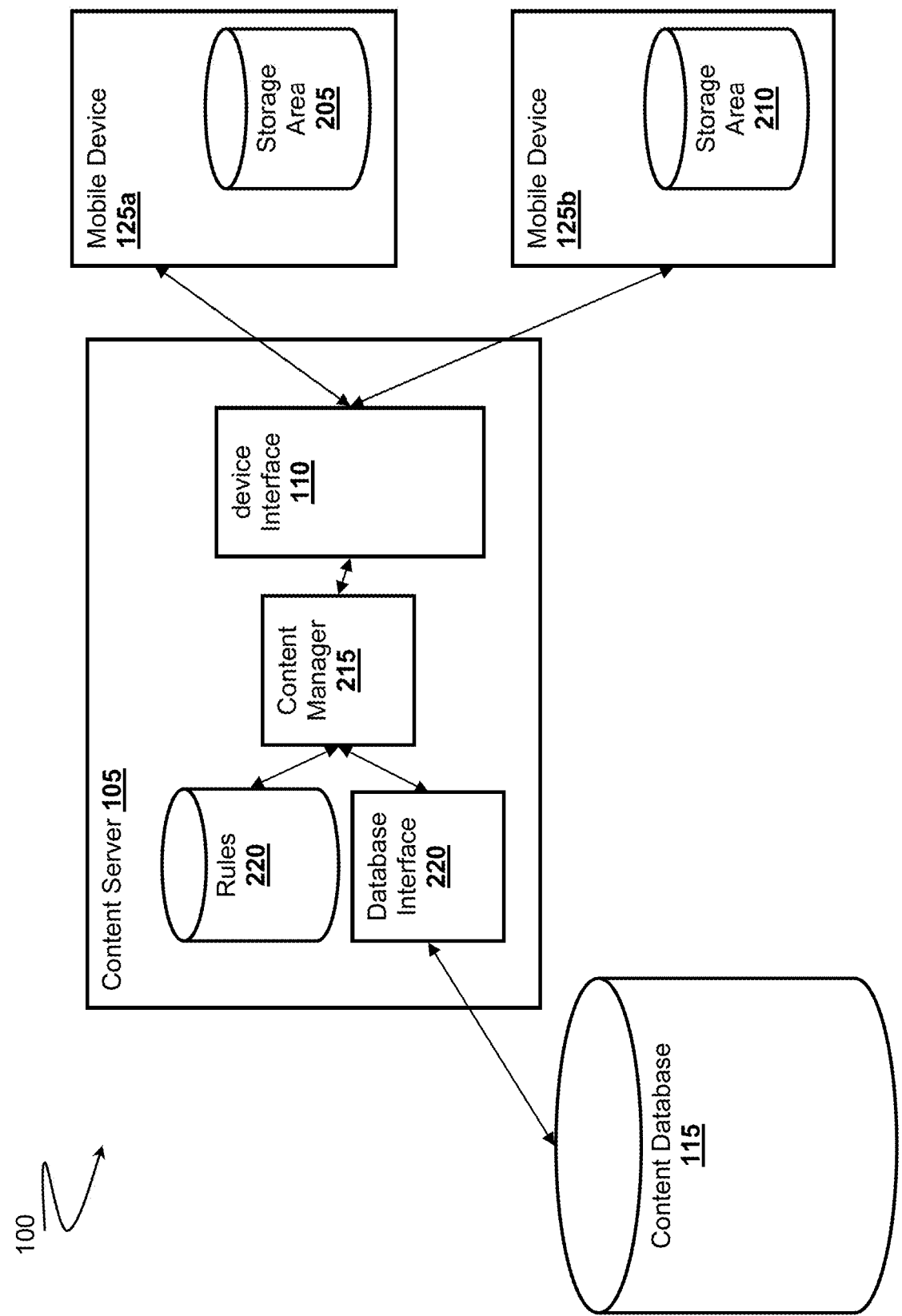
FIG. 2 illustrates the schematic of the data storage system in detail.

FIG. 2 illustrates the storage system 100 in more detail. As shown in the figure, the content server 105 includes a content manager 215, a database interface 220 configured to communicate with the content database 115, a device interface 110 configured to communicate with the mobile devices 125a and 125b, rules database 220 storing sets of multi-conditional content activation criteria for different content stored in the content database 115. The content server 105 can be further configured to exchange content with the mobile devices 125a and 125b via a content exchange protocol. The content exchange protocol could include at least one of a universal plug-in-play protocol, a Digital Living Network Alliance (DLNA) framework, a media transport protocol, or a high definition multi-media interface protocol.

In some embodiments, the mobile device 125a is identical to the mobile device 125b. In other embodiments, mobile devices 125a and 125b are different devices, and are communicatively coupled with each other via a connection or network. In some embodiments, the content database is physically located at a remote location with respect to the mobile devices and/or the content server 105.

Mobile devices 125a and 125b can be the same mobile device or different mobile devices that are connected with each other over a network, as stated above (e.g., personal network, peer-2-peer network, etc.). Each mobile device 125a and 125b also includes a storage area (such as storage area 205 for mobile device 125a and storage area 210 for mobile device 125b) for storing data for use by software applications that can be executed in the mobile devices 125a and 125b. Preferably, each of the storage areas 205 and 210 has storage capacity that is smaller than the capacity of the content database 115. Thus, it is conceived that most or all of the content data that can be used by the mobile devices' software applications is permanently stored in the content database 115.

The storage areas 205 and 210 on each of mobile devices 125a and 125b can be at least partially under control of the content server 105 and can be configured to restrict access to any content under command of the content server 105. Alternatively, the storage areas 205 and 210 can comprise a demarcated secured portion that is secured under the command of the content server. In even further alternative embodiments, the storage areas 205 and 210 can compose a virtual machine that is at least partially under control of the content server 105. In such embodiments, the interaction between the mobile devices 125a/125b and the content database 115 can occur within the virtual machine under command of the content server 105.

As mentioned above, each content that is stored in the content database 115 can be activated for use by a particular software application. In some embodiments, the content can be activated upon a mobile device detecting an activation event (e.g., a user input such as a click, a gesture, a sound, or a command via the user interface of the mobile device, a detection of sensor data, a change of sensor data, and image capture, a point-of-use, a payment, a rating, a vote, and a context etc.). However, since the content can be large in size and is usually stored in the content database that is remote from the mobile devices 125a and 125b, the content needs to be transmitted from the content database 115 to at least one of the mobile devices 125a and 125b before the content can be used by the software application. Due to bandwidth limitations and network traffic, it is conceived that transmitting the desired data upon detecting the activation event can cause substantial and undesirable latency in using the application. Thus, it is conceived that the storage system 100 can cause some or even all of the data to be transmitted to the storage area of at least one of the mobile devices 125a and 125b before the activation event is detected.

In some embodiments, the content server 105 uses the sets of multi-conditional content activation criteria to determine which content is to be transmitted to the mobile devices 125a and 125b at which point in time before the activation events of the content are detected. Specifically, the multi-conditional content activation criteria indicates what condition(s) needs to be met before beginning to transmit content data from the content database 115 to the mobile devices 125a and 125b. One should appreciate that the multi-conditional content activation criteria servers multiple, simultaneous functions. First, the criteria has rules and conditions that govern caching or storage of the activatable content as inactive content. Second, the complete criteria indicate when the inactive content becomes activated. Thus, the system has a single set of rules.

The conditions can depend on different types of factors, such as sensor data from the mobile devices (e.g., location tracking data, temperature, image data captured by an optical sensor on the device, time data, detection of an external device, etc.), payment data, user interaction with at least one of the mobile devices, issuance of a payment, a user interaction with the mobile device, the context of the mobile device, or the recognition of a digital representation of an object as a target object. The digital representation of an object can represent at least one of a sound, a symbol, a two dimensional object, a three dimensional object, a movement, an image, a magazine, a newspaper, a display screen, a toy or a vehicle.

The multi-conditional content activation criteria for each part of the content can also include a combination of these different types of factors. For example, the content server 105 can determine to begin transmitting content related to a specific application to the mobile devices 125a and 125b when several types of sensor data in combination with the user interaction data meets the criteria specified in the multi-conditional content activation criteria for the content.

Instead of transmitting a complete set of content for a specific application all at once upon the satisfaction of the entire multi-conditional content activation criteria for the content, the content server 105 of some embodiments can be configured to progressively transmit different portions of the content when a different subset of the conditions within the multi-conditional content activation criteria for the content is satisfied.

For example, when the multi-conditional content activation criteria for a set of content includes five conditions (Condition 'A', Condition 'B', Condition 'C', Condition 'D', and Condition 'E') and associated caching rules, the content server 105 can be configured to transmit portions of the content according to this example set of rules: begin transmitting one third of the content to the mobile devices when two of the conditions are satisfied, begin transmitting another one third of the content to the mobile devices when another two of the conditions are satisfied, and then transmitting the remaining content when the final condition is also satisfied. In some embodiments, this set of rules can also specify which conditions (e.g., Condition 'A' and Condition 'C') should be satisfied for which portion of the content (e.g., which files) to be transmitted. One benefit of this progressive transmission is to spread out the network traffic and to allow more time for the entire set of content to be transmitted. Contemplated rules governing storage or caching of the content can operate as a function of the conditions, nature of the content, rights management, or other factors.

Instead of transmitting the portions of the content immediately after detecting the satisfaction of one or more conditions, the content server 105 can also be configured to transmit the portion of the content during a particular time period (e.g., off-peak hours) or according to a fee schedule.

In addition to being progressive, the content server 105 can also be configured to be regressive in transmitting content to the mobile devices 125a and 125b. Specifically, once the content server 105 has transmitted a portion of the content to the mobile devices because a subset of conditions from the multi-conditional content activation criteria are satisfied, the content server 105 can also be configured to cause the mobile devices to remove the portion of the content (i.e., discard, free up or even overwrite memory that is used to store the portion of the content) when at least one condition from the subset of conditions is no longer satisfied. This regressive feature allows the mobile devices to free up memory space when it is no longer needed and allows for better security in the content as the content will not be stored in the mobile device when it is not needed.

Thus, the content server 105 would continuously transmit portions of the content to the mobile devices 125a and 125b as the more conditions within the multi-conditional content activation criteria are satisfied. In some embodiments, the content server also removes portions of the content from the mobile devices 125a and 125b when some of the conditions from the multi-conditional content activation criteria have changed from satisfied to dissatisfied. As all conditions within the multi-conditional content activation criteria have been satisfied, the content server 105 should cause the entire content for the application to be transmitted to the mobile devices 125a and 125b.

Preferably, the entire content for the application is transmitted to the mobile devices 125a and 125b before any content activation event is detected. Upon detecting the content activation event when all conditions are satisfied, and the complete transmission of the entire content for the application, the mobile device 125a or 125b is configured to activate the content. In some embodiments, the content server 105 or mobile devices can activate the content on the mobile devices 125a and 125b by at least one of several possible techniques. Content can be activated by unlocking the content, decoding the content, revealing the content, extracting the content, decompressing the content, rendering and presenting the content, expanding the content, delivering the content, translating the content, converting the content, authorizing access, indexing the content, configuring the mobile devices and/or the content server 105 using the content, modifying the content, authenticating a user, moving the content to a non-content server controlled memory, or any other means of making the content usable.

Once the content is activated, the content server 101 can enable the mobile devices 104 to interact with their respective stored content. The interaction could be at least one of a presentation of the content, an execution of the content, a transmission of the content, a deletion of the content, a management of the content, an indexing of the content, a configuration based on the content, a transaction related to the content, and a modification of the content.

In the storage system 100, content that has been transmitted and stored in one mobile device within the network of mobile devices can be used/activated by another mobile device within the network. Thus, content that is stored in mobile device 125a can be used by an application running on mobile device 125b. In addition, the storage system 100 can further comprise a distributed storage area network comprising storage areas of at least some of the mobile devices. The distributed storage area network comprises an optic fiber backbone, mesh network backbone, an ad hoc network backbone, a personal area network backbone, or other type of network. In these embodiments, the content server 105 is also configured to manage content stored in the distribute storage area network.

Further, the distributed storage area network can be independently powered and can be powered, at least in part, by gasoline. The data density of the distributed storage area network can be at least one Terabyte per 100 m$^2$. The storage areas of the distributed storage area network can move relative to one another. In total, the storage area can comprise one gigabyte of storage capacity or more. Such an approach in embodiments where the mobile devices comprise vehicles and each vehicle has a storage area (e.g., local hard drive, local solid state drive, etc.). Thus, a highway filled with cars can operate as a distributed storage facility for all cars on the highway or for edge devices near the highway.

One use of such a distributed storage area network could be to distribute large data content sets across moving devices such as vehicles or apparel. With the costs of readable memory continuing to fall, data can be stored at low cost and in minimal dimensions on an expanding list of everyday devices and items, including devices not typically associated with data storage. By distributing data across such devices, particularly those that are portable, a distributed storage network could benefit from several advantageous technical effects such as improved data transfer across local or short-ranged networking protocols, improved access during periods of lost network connectivity, improved data encryption or user anonymity, or potential reductions in the cost of storing data content.

Figure 3:
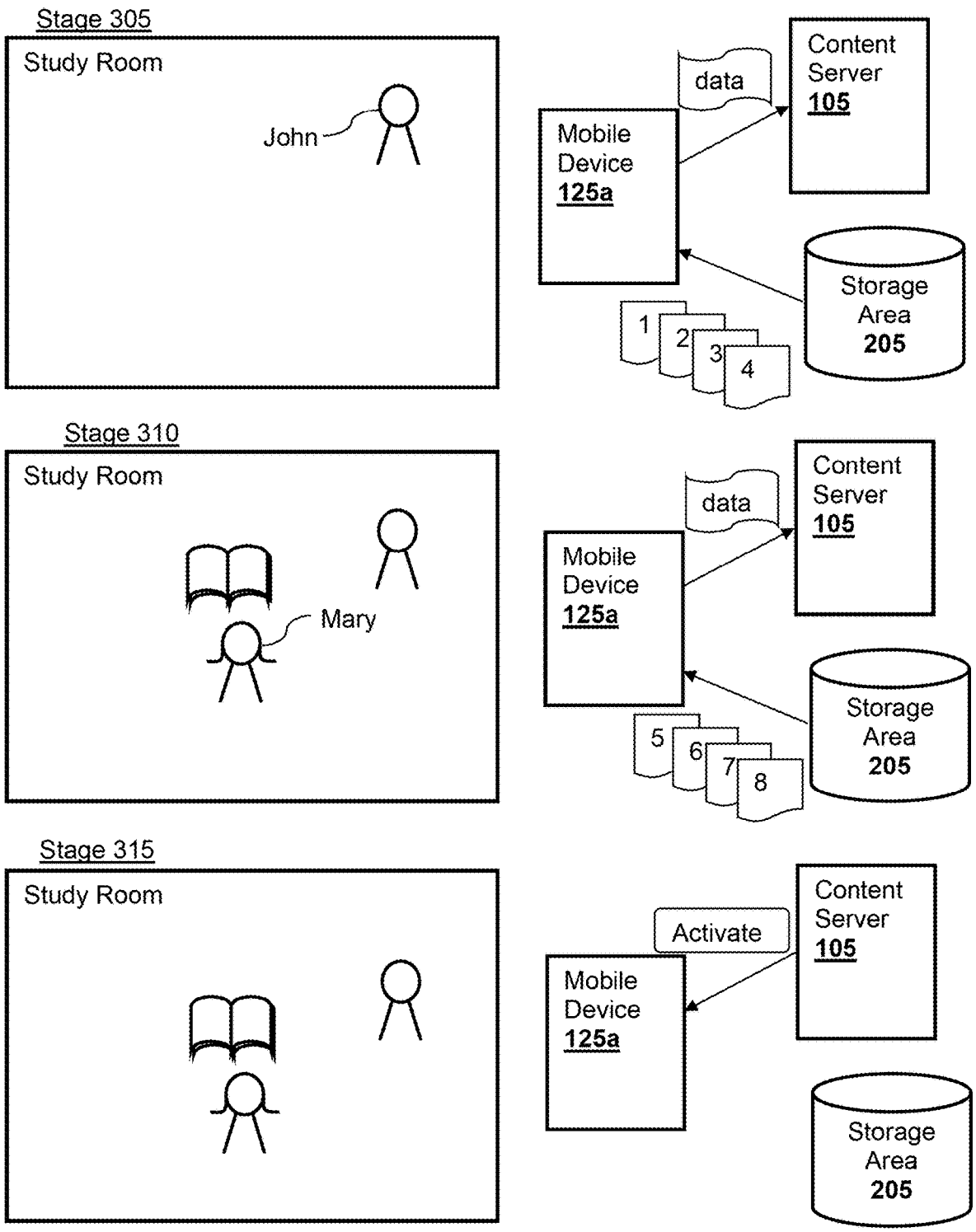
FIG. 3 illustrates operations of the data storage system.
Figure 4:
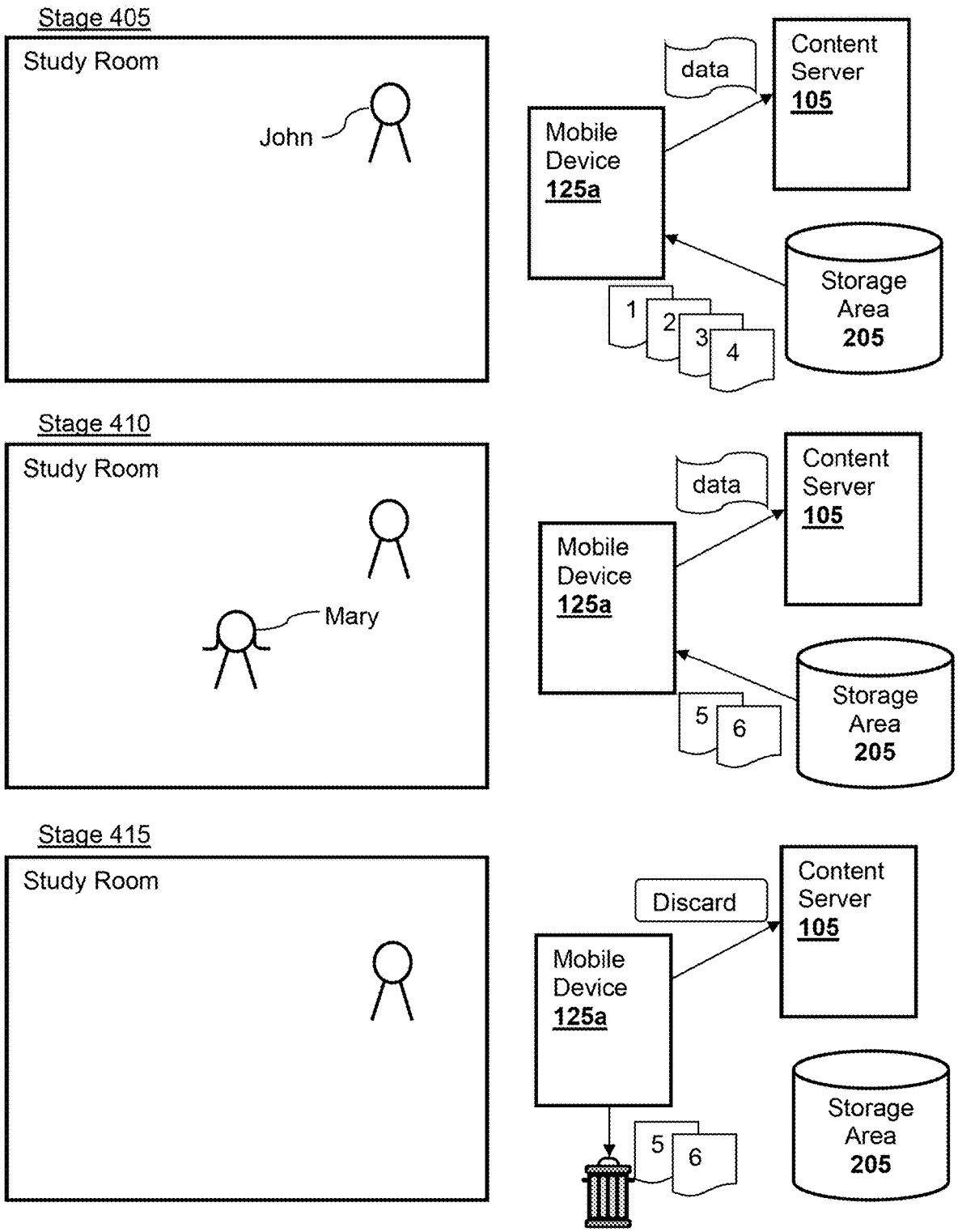
FIG. 4 illustrates different operations of the data storage system.
Figure 5:
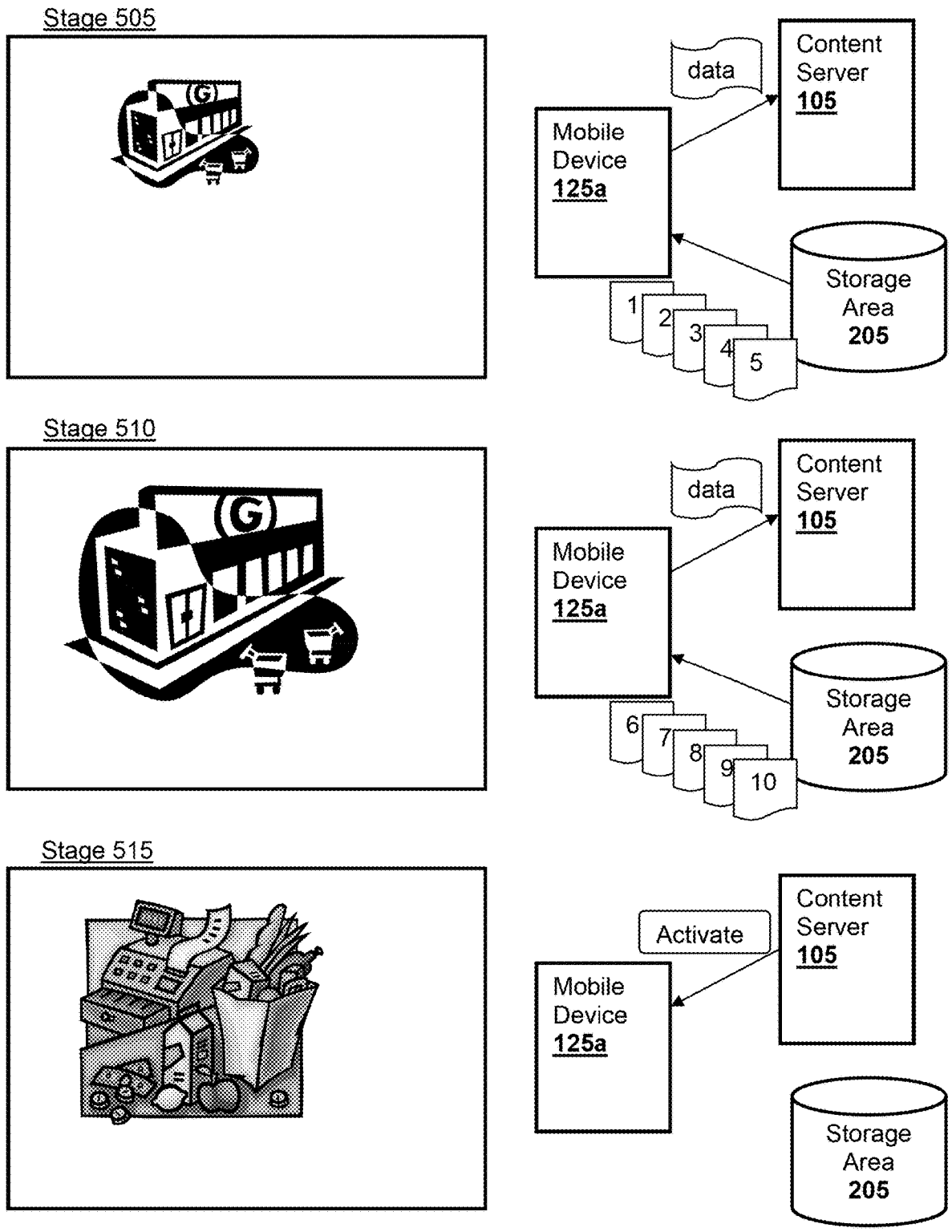
FIG. 5 illustrates additional operations of the data storage system.

FIGS. 3-5 further illustrates the operations of the storage system 100 by way of different real-world examples. Specifically, FIG. 3 illustrates an example of using the storage device to pre-load (cache) content data via three stages (stage 305, stage 310, and stage 315) of the figure. As shown in FIG. 3, mobile device 125 is communicatively coupled with content server 105 and content database 115. In this example, the content database 115 stores, among other things, eight audio files for a music player within the mobile device 125. The eight audio files are activatable content as the music player can activate the audio files by decoding and playing the files. The content server 105 also includes a rules database 220 (not shown) that includes multi-conditional content activation criteria for content (e.g., the eight audio files) related to the music player.

The multi-conditional content activation criteria include the following three conditions: (1) location is the study room; (2) John is in the study room; (3) Mary is in the study room; and (4) law school reading materials are in the study room. In addition to the conditions, the multi-conditional content activation criteria also specifies the following data transmission rules: (a) transmit one fourth of the content (e.g., the first two files of the eight audio files) when one of the four conditions is satisfied; (b) transmit another one fourth of the content (e.g., the next two files of the eight audio files) when two of the four conditions are satisfied; (c) transmit another one fourth of the content (e.g., the next two files of the eight audio files) when three of the four conditions are satisfied; and (d) transmit the remainder of the content (e.g., the last two files of the eight audio files) when all four conditions are satisfied. Preferably, mobile device 125 includes a location sensor and object recognition sensor that is configured to recognize both John and Mary (through image recognition, audio recognition, etc.).

In stage 305, the content server 105 has detected that the mobile device is located within the study room and that John is also in the study room (e.g., based on facial recognition data). In this example, the location of the mobile device can be detected in many ways. In some embodiments, the mobile device can store the location coordinate of the study room, and can include a location tracking sensor (e.g., a GPS module) that communicates with the satellites to determine whether the location of the mobile device coincide the location of the study room. In other embodiments, the mobile device can communicate with external devices (e.g., RFID chips) located in proximity of or within the study room to determine the location of the mobile device with respect to the study room.

Similarly, the mobile device can detect the presence of John in the study room in many ways. In some embodiments, the mobile device can include an optic sensor and a facial recognition module. The mobile device first allows the user to capture a digital representation of the study room that includes any objects located within the room, the mobile device then uses the facial recognition module to determine if there is any person located within the room, and whether the person's facial features coincide with that of John. In other embodiments, the mobile device can use the voice (or any other detectable and distinctive features) of people in the room to determine whether John is present in the room.

Upon detecting that these two conditions are met, the content server 105 instructs the mobile device 125 to receive the first four audio files from the content database 115, as two of the four conditions within the multi-conditional content activation criteria are satisfied.

In stage 310, the content server 105 has detected that Mary and law school reading materials are also in the study room along with John. Accordingly, the content server 105 instructs the mobile device 125 to receive the last four audio files from the content database 115, as all four conditions within the multi-conditional content activation criteria are satisfied. At this point, all eight audio files that are related to the audio player have been transmitted to the mobile device 125. They are stored in a storage area of the mobile device 125, but are not activated yet as the content activation event has not been detected. In this example, the content activation event can be a user (e.g., John, Mary, or a user of the mobile device 125) hitting the "play" button of the music player.

In stage 315, the mobile device 125 has detected a content activation event (e.g., the user hits the play button of the music player of the mobile device 125). Thus, the mobile device 125 begins to activate the content (e.g., decoding the playing the audio file one by one).

FIG. 3 illustrates an example of progressively pre-loading content related to an application according to the multi-conditional content activation criteria of the content. FIG. 4 illustrates an example in which the content server is configured to regressively remove some portion of the content from the mobile device according to the multi-conditional content activation criteria of the content. Specifically, the example in FIG. 4 is illustrated via three different stages (stage 405, stage 410, and stage 415). As shown in the figure, mobile device 125 is communicatively coupled with content server 105 and content database 115. The content database 115 also stores the eight audio files as described above. The content server 105 also includes the multi-conditional content activation criteria for the eight audio files. In addition to the four transmission rules enumerated above, the content server 105 also includes this additional rule: remove a portion of the audio files when the corresponding condition is no longer satisfied.

Stage 405 is identical to stage 305 of FIG. 3. Specifically, the content server 105 has detected that the mobile device is located within the study room and that John is in also in the study room (e.g., based on facial recognition data). Accordingly, the content server 105 instructs the mobile device 125 to receive the first four audio files from the content database 115, as two of the four conditions within the multi-conditional content activation criteria are satisfied.

In stage 410, the content server 105 has detected that Mary is also in the study room along with John. Accordingly, the content server 105 instructs the mobile device 125 to receive the next two audio files from the content database 115, as three of the four conditions within the multi-conditional content activation criteria are satisfied.

In stage 415, however, after the next two audio files were received in the mobile device 125, it is detected that Mary has left the study room. Thus, condition (3) is no longer satisfied. According to the transmission rules, the content server 105 causes the two audio files that were received at the mobile device upon the satisfaction of condition (3) (i.e., the two audio files that were received in stage 410) to be removed from the mobile device 125. The removal of these audio files frees up space within the mobile device 125 and also provides better security of the content.

FIG. 5 illustrates another example of using the storage device to pre-load (cache) content data via three stages (stage 505, stage 510, and stage 515) of the figure. As shown in FIG. 5, mobile device 125 is communicatively coupled with content server 105 and content database 115. In this example, the content database 115 stores, among other things, object recognition data for ten different objects that are commonly found in a grocery store. The object recognition data is activatable, and it can be activated by an object recognition application that is executed in the mobile device 125 to recognize (or detect) the different objects within a grocery store. The content server 105 also includes a rules database 220 (not shown) that includes multi-conditional content activation criteria for content (e.g., the object recognition data) related to the object recognition application.

The multi-conditional content activation criteria include the following three conditions: (1) a grocery store is within 50 meters of the mobile device; and (2) a grocery store is within 5 meters of the mobile device. In addition to the conditions, the multi-conditional content activation criteria also specifies the following data transmission rules: (a) transmit one half of the content (e.g., object recognition data for five of the ten objects) when the first condition is satisfied; and (b) transmit the remaining content (e.g., object recognition data for the other five objects) when the second condition is satisfied. Preferably, mobile device 125 includes a location sensor and object recognition sensor that is configured to recognize a grocery store and determine a distance between the grocery store from the mobile device (through image recognition, etc.). The mobile device 125 can also cooperate with external devices (e.g., RFID chip) that are placed near or inside the grocery store to enable to mobile device 125 to determine its location with respect to the grocery store.

In stage 505, the content server 105 has detected that a grocery store is within 50 meters from the mobile device (e.g., based on object recognition data for a grocery store). Accordingly, the content server 105 instructs the mobile device 125 to receive object recognition data for the first five objects from the content database 115, as the first condition within the multi-conditional content activation criteria is satisfied.

In stage 510, the content server 105 has detected that the grocery store is within 5 meters from the mobile device 125. Accordingly, the content server 105 instructs the mobile device 125 to receive the object recognition data for the remaining objects from the content database 115, as the second condition within the multi-conditional content activation criteria is satisfied. At this point, the object recognition data for all objects related to the grocery store has been transmitted to the mobile device 125. The object recognition data is stored in a storage area of the mobile device 125, but is not activated yet as the content activation event has not been detected. In this example, the content activation event can be a user launching (initiating) of the object recognition application or the detection of the mobile device located inside the grocery store.

In stage 515, the mobile device 125 has detected a content activation event (e.g., the user initiating the object recognition application of the mobile device 125, detection of the mobile device 125 within the grocery store, etc.). Thus, the content server 105 instructs the mobile device 125 to activate the content. Once activated, the object recognition application can begin using the downloaded object recognition data to recognize objects, present materials related to the objects (e.g., promotion items, description, transaction data, etc.).

Yet another use case includes storing or caching content within medical devices. In such embodiments, patient data can be used to control the multi-conditional activation criteria. The conditions of the criteria can operate as a function of the criticality of the patient's health for example; perhaps based on blood pressure data, pulse-ox data, heart rate data, breathe rate data, or other factors. Patient records or other patient related information can be cached within the relative medical devices. For example, a doctor might have a tablet computer configured to render a patient's data. As each progressive condition within the patient data activation criteria is met, more of the patient data can be migrated to the tablet. When the patient goes critical, or when the full criteria is met, the patient data can be activated and presented to the doctor.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer-based content activation system comprising:
  a content database storing activatable content having content activation rules, including at least one rule based on location, having multiple activation conditions;
  at least one non-transitory computer-readable memory storing software instructions; and
  at least one processor coupled with the content database and the at least one non-transitory computer-readable memory and that performs, upon execution of the software instructions, the operations of:
    obtaining a location of a mobile device based on sensor data from at least one sensor;
    receiving at least some of the activatable content by the mobile device upon satisfaction of the at least one rule based on location within the content activation rules;
    storing in a memory of the mobile device the at least some of the activatable content as inactive content;
    activating the inactive content as activated content upon satisfaction of the content activation rules of the corresponding at least some of the activatable content based on at least the location and movement of the mobile device due to an interaction with a content activation event corresponding to a game console, wherein the activated content includes a presentation of a promotion item and transaction protocols for an electronic exchange related to the content activation event corresponding to the game console; and enabling the mobile device to conduct a transaction with the activated content once activated.

2. The system of claim 1, wherein the multiple activation conditions further depend on time.

3. The system of claim 2, wherein the operation of receiving the at least some of the activatable content further depends upon satisfaction of at least one time rule based on time.

4. The system of claim 2, wherein the operation of activating the inactive content further depends upon satisfaction of the multiple activation conditions with respect to time.

5. The system of claim 1, wherein the activatable content comprises at least one of the following types of content: recognition data, audio data, video data, image data, text data, map data, traffic data, kinesthetic data, application data, telematics data, functionality data, medical data, patient data, or business data.

6. The system of claim 1, wherein the activatable content relates to a game device.

7. The system of claim 1, wherein the mobile device comprises at least one of the following: mobile phone, a laptop, a tablet, a portable game console, an e-book reader, an electronic pen, or a medical device.

8. The system of claim 1, wherein the operation of activating the inactive content includes unlocking the inactive content.

9. The system of claim 1, wherein the content database is remote relative to the mobile device.

10. The system of claim 1, wherein the operations further include restricting access to the activated content.

11. The system of claim 1, wherein the operation of receiving the at least some of the activatable content further depends upon satisfaction of at least one rule in the multiple activation conditions that depends on at least one of the following: a temperature, an image, a device detection, a payment, a user interaction, or a recognition.

12. The system of claim 1, wherein the operation of receiving the at least some of the activatable content further depends upon satisfaction of at least one rule in the multiple activation conditions that depends upon a device context.

13. The system of claim 1, wherein the operation of receiving the at least some of the activatable content further depends upon satisfaction of at least one rule in the multiple activation conditions that depends one or more of the following: a sound, a symbol, a 2D object, a 3D object, a movement, an image, a magazine, a newspaper, a display screen, a toy, a vehicle, or a gesture.

14. The system of claim 1, wherein the operation of activating the inactive content further depends upon satisfaction of the multiple activation conditions with respect one or more of the following: a sound, a symbol, a 2D object, a 3D object, a movement, an image, a magazine, a newspaper, a display screen, a toy, a vehicle, or a gesture.

15. The system of claim 1, wherein the transaction comprises a payment.

16. The system of claim 1, wherein the transaction includes at least one of the following: a presentation of the activated content, an execution of the activated content, a transmission of the activated content, a deletion of the activated content, a management of the activated content, an indexing of the activated content, a configuration based on the activated content, or a modification of the activated content.

17. The system of claim 1, wherein the location includes a GPS location.

18. The system of claim 1, wherein the sensor data includes at least one of the following: a location coordinate, a room location, a proximate device location, point of use data, or RFID data.

19. The system of claim 1, wherein the operations further include transmitting the inactive content to a second mobile device.

20. The system of claim 1, wherein the at least one sensor comprises an optical sensor.

21. A non-transitory computer-readable memory (CRM) storing software instructions thereon that, when executed by at least one processor, cause the at least one processor to perform operations to:

obtain a location of a mobile device based on sensor data from at least one sensor;

receive at least some of activatable content by the mobile device upon satisfaction of at least one rule based on location within content activation rules;

store in a memory of the mobile device the at least some of activatable content as inactive content;

activate the inactive content as activated content upon satisfaction of the content activation rules of the corresponding at least some of the activatable content based on at least the location and movement of the mobile device due to an interaction with a content activation event corresponding to a game console, wherein the activated content includes a presentation of a promotion item and transaction protocols for an electronic exchange related to the content activation event corresponding to the game console; and enable the mobile device to conduct a transaction with the activated content once activated.

22. A method comprising:

obtaining a location of a mobile device based on sensor data from at least one sensor;

receiving at least some of activatable content by the mobile device upon satisfaction of at least one rule based on location within content activation rules;

storing in a memory of the mobile device the at least some of activatable content as inactive content;

activating the inactive content as activated content upon satisfaction of the content activation rules of the corresponding at least some of the activatable content based on at least the location and movement of the mobile device due to an interaction with a content activation event corresponding to a game console, wherein the activated content includes a presentation of a promotion item and transaction protocols for an electronic exchange related to the content activation event corresponding to the game console; and enabling the mobile device to conduct a transaction with the activated content once activated.

* * * * *